G. E. BURT.
Horse Rake.
No. 46,776. Patented March 14, 1865.
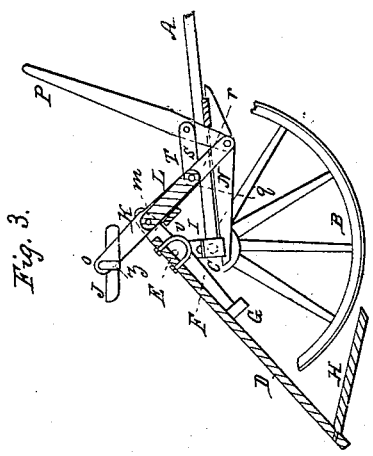
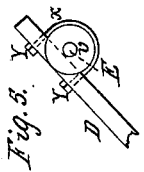
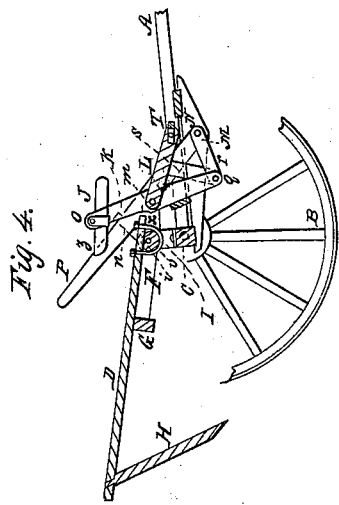
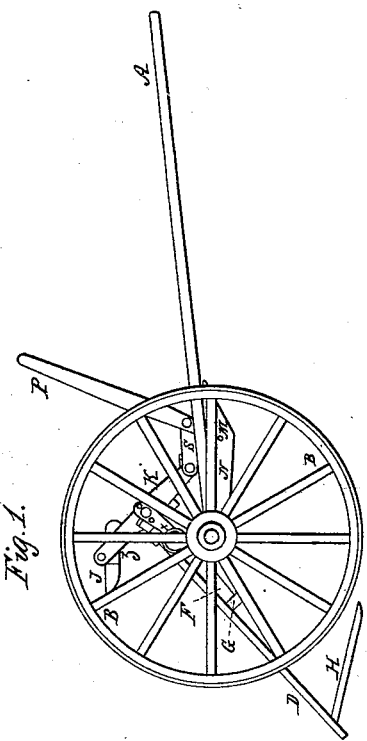
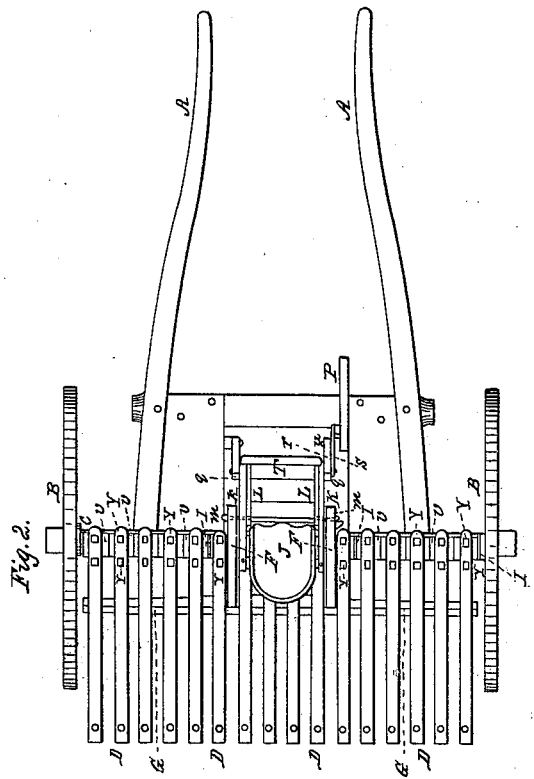
Witnesses:
Edwin A. Hildreth
Emory Barnard
Inventor:
George E. Burt.

UNITED STATES PATENT OFFICE.

GEORGE E. BURT, OF HARVARD, MASSACHUSETTS.

IMPROVEMENT IN HORSE-RAKES.

Specification forming part of Letters Patent No. 46,776, dated March 14, 1865.

*To all whom it may concern:*

Be it known that I, GEORGE E. BURT, of Harvard, in the county of Worcester and State of Massachusetts, have made new and useful Improvements in Horse-Rakes; and I do hereby declare that the following is a full and exact description thereof, reference being had to the accompanying drawings, and to the letters of reference marked thereon, in which—

Figure 1 is a side elevation. Fig. 2 is a bird's-eye view. Fig. 3 is a vertical longitudinal section, showing the position of the rake tooth and arm, the elevating-bar, lever, seat, &c., when the teeth are in position to rake. Fig. 4 is a vertical longitudinal section, showing the same parts as Fig. 3, but with the rake-teeth elevated or in the position of discharging the hay. Fig. 5 is the grip to attach the teeth-arms to the cylinder and the cylinder by which the arms are connected to the rod.

Like letters represent like parts in all the figures.

The nature of my invention consists in constructing a horse-rake with the seat for the operator so arranged that his weight may be made to assist him in raising the arms and teeth in discharging the rake, thereby enabling the operator to work the rake with the greatest ease; the operator's seat is readily adjusted for a person of more or less weight; also, in constructing the teeth and their connections so that they can be removed, attached, or repaired without disturbing any other part of the rake, thus enabling the builder to furnish a rake at small cost, easily operated, and readily repaired.

To enable others skilled in the art to make and use my invention, I will proceed to describe its construction and operation.

I construct my rake with independent acting teeth mounted upon wheels in the usual manner.

In the accompanying drawings, A A are the shafts; B B, the wheels; C, the axle; D D, the teeth-arms; H, the teeth. F F are elevating-arms, which are framed to the elevating-bar G. E is a rod which pivots all the arms D and F to the standards I I I I. (Shown in Figs. 2, 3, and 4.)

I construct the operator's seat J with ears $z\,z$, which, by the pivots $o\,o$, are attached to the top of the seat-bars K K, which are pivoted to the elevating-arms F F by pivots $m\,m$. The arms F F are supported by the rod $e$. (Shown in Figs. 1, 3, and 4.) The seat-bars K K are connected to the operating-lever P by the pivot $q$ and projecting arm $r$, which is rigidly fixed to the lever P by the brace $s$. The operating-lever P is pivoted to the bar N by the pivot $u$. (Shown in Figs. 1, 2, 3, and 4.) The standards I I I I are attached to the axle C and support the rod $e$, which forms the pivot upon which all the teeth-cylinders $v\,v\,v$ and the elevating-arms F F turn.

T is a foot-board, which is pivoted to the arms L L, and is supported by the pivots $m\,m$. (Shown in Figs. 2, 3, and 4.) I construct the teeth-cylinders $v\,v$ by turning blocks of wood of suitable size, with a hole in the center for the rod $e$, and make a groove of sufficient depth to receive the grip $x$, also cut a seat to receive the tooth-arm D, through which arm D holes are made to pass the ends of the grip $x$, and by turning down the nuts $y\,y$ the cylinder $v$ and arm D are firmly held together. (Shown in Fig. 5.) $w$ is a hook to hold the lever P down when passing from one field to another. (Shown in Figs. 1 and 4.)

Operation: When a horse is attached to the rake, the shaft being elevated to a proper position and the driver places himself in the seat J, his weight will rest on the pivots $o\,o$, which come (when the teeth rest on the ground) a very little back of a perpendicular line passing through the pivots $m$. This will cause the projecting arm $r$ to rise, and the operating-lever P will be forced back against the cross-bar of the shafts A A, which will cause the elevating-bar G to drop sufficiently to allow the teeth-arms D and the teeth H to play up or down, so as to follow an irregular surface. When the rake becomes loaded with hay and the driver or operator wishes to discharge it, he reaches forward to take hold of the operating-lever P to pull it toward him, and this action tends to throw his weight partly on his feet and upon the foot-board T, which acts upon the projecting arms $r$ and lever P, moving the seat J instantly forward, and the whole weight of the operator and all the power he applies to the lever P is instantly exerted to raise the rear end of the elevating-arms F F and the elevating-bar G, which lifts all the finger-arms and the teeth of the rake, and the hay is quickly discharged. The seat J swings on the pivots $o\,o$ and adjusts itself to any position required by the seat-bars K K. The teeth are again brought into position by the operator pushing the lever P back to its original position, which acts reversely upon the rake from pulling the lever forward, and the movement tends instantly to throw the balance in the opposite direction to what it did in raising and discharging. Thus the rake is very quickly brought back to its original position with a very easy and rather pleasant motion for the operator, and so natural that it requires but very little experience to operate it perfectly.

The operation of the device for constructing the teeth-arms D and connecting them to the rod e enables the farmer to remove a broken tooth-arm (which often occurs by backing up to stone walls, trees, &c.,) without driving out the rod e, which, in the usual form of constructing rakes, passes directly through the teeth-arms; and if an arm gets injured near the center of the rake it often causes the loss of much valuable time to drive out the rod, which is often a very difficult job, as it gets bent; also, if a commonly-constructed arm gets warped, it throws the point of the tooth out of place, and it will not rake clean; but by this device, if an arm gets warped, the nuts $y\,y$ may be removed or loosened and the arm-seat in the cylinder be so altered as to cause the tooth to stand in its proper position. The grip $x$ passes around the cylinder $v$ and holds it so that it cannot split, and the cylinders $v$ may be made to fit closely one to the other, still playing freely, as they are constructed endwise of the timber and are not affected by moisture like the teeth of common construction; also, the even and broad surfaces of the ends of the cylinders hold the arms and teeth very firmly and effectually in their places.

What I claim, and wish to secure by Letters Patent, is—

1. The combination of the seat J with the arms F F, and with a rake constructed and arranged, substantially in the manner specified, so that the weight of the operator will assist in operating the rake, substantially as described, and for the purposes set forth.

2. The arrangement and combination of the arms D, the grip $x$, and cylinder $v$, constructed substantially as described, for the purposes set forth.

GEORGE E. BURT.

Witnesses:
EDWIN A. HILDRETH,
EMORY BARNARD.